United States Patent [19]
Sepehri et al.

[11] Patent Number: 5,616,998
[45] Date of Patent: Apr. 1, 1997

[54] PROPORTIONAL DERIVITIVE CONTROL SYSTEM WITH LOW SPEED OFFSET COMPENSATION

[75] Inventors: Nariman Sepehri, Winnipeg; Todd A. Corbet, Nanaimo; Peter D. Lawrence, Vancouver, all of Canada

[73] Assignees: The University of British Columbia, Vancouver; The University of Manitoba, Winnipeg, both of Canada

[21] Appl. No.: 524,388

[22] Filed: Sep. 5, 1995

[51] Int. Cl.$^6$ ................................. G05B 13/02
[52] U.S. Cl. ............... 318/568.22; 318/606; 318/610; 364/160; 364/163
[58] Field of Search ...................... 318/560, 561, 318/568.22, 606–611; 364/148, 160, 163

[56] References Cited

U.S. PATENT DOCUMENTS

| | | | |
|---|---|---|---|
| 4,727,303 | 2/1988 | Morse et al. | 318/616 |
| 5,119,288 | 6/1992 | Hiroi | 364/163 |
| 5,182,703 | 1/1993 | Yamamoto | 364/148 |
| 5,195,036 | 3/1993 | Kimura et al. | 364/424.1 |
| 5,325,288 | 6/1994 | Satou | 364/162 |
| 5,394,322 | 2/1995 | Hansen | 364/148 |
| 5,465,035 | 11/1995 | Scaramuzzo, Jr. et al. | 318/561 |

*Primary Examiner*—Brian Sircus
*Attorney, Agent, or Firm*—C. A. Rowley

[57] ABSTRACT

A robot control system generates an offset signal which is added to the control signal for a robot when the velocity error is small. The offset signal is, in each case, based on a previous offset signal added to the then current robot control signal which is updated regularly on discrete increments of time when the velocity error is small. Thus, with the control system when the velocity error is low adds the control signal to the then current offset signal to provide a corrected signal to control the robot. When the velocity error signal is high, the generation and addition of the offset signal is disabled.

16 Claims, 2 Drawing Sheets

PROPORTIONAL DERIVITIVE CONTROL SYSTEM WITH LOW SPEED OFFSET COMPENSATION

FIELD OF INVENTION

The present invention relates to a controller, more particularly, the present invention relates to a controller with an added offset signal to compensate for steady state errors.

BACKGROUND OF THE INVENTION

Conventional proportional derivative (PD) type controllers are widely used in industry even in some of the most advanced controllers due to the simplicity and proven stability of the PD controllers.

The use of a PD type controller does not effectively handle steady state errors which are derived, for example in a hydraulic robot, from the flow deadband nonlinearity due to control valve (spool valve) deadband, friction resisting spool displacement, robot joint friction and load.

The use of proportional integrated derivative type controls (PID) are reasonably effective in eliminating some steady state errors but are generally ineffective with respect to overshoot wherein the end point of the robot travels beyond its intended target.

U.S. Pat. No. 4,777,303 issued Feb. 23, 1988 to Morse et al. describes a specific system for applying an offset signal to a controller to compensate for steady state error and provide a faster settling time for controlling dynamic manipulators such as robots. In this system the offset signal comprises the integration of the position error weighted by a function of the angular shaft velocity. This system is only active when the load velocity is so low when sticking is imminent.

Morse et al. specifically pertains to controllers where the rate varying factor goes to zero as the velocity approaches infinity, therefore, the system of Morse et al does not reset to zero on velocity reversal, and is not effective in ensuring proper tracking of the end point along the selected trajectory.

BRIEF DESCRIPTION OF THE PRESENT INVENTION

It is an object of the present invention to provide a hydraulic controller that compensates for flow deadbands in hydraulic valves.

It is a further object of the present invention to provide an offset signal system for supplementing the control signal of a robot to compensate for steady state errors.

Broadly, the present invention relates to the method and apparatus of controlling a robot comprising generating an error signal X related to a velocity error signal $\omega_e$, generating robot control signal $U_{PD}$, activating an offset signal system when said error signal X is less than a preselected maximum $X_L$, said offset signal system actuating a repeating cycle timer and enabling a bypass means, said timer enabling an updating means at the end of each time cycle T defined by the repeating cycle timer to deliver said robot control signal $U_{PD}$ to a first adder when said updating means is enabled, said first adder outputting an offset signal $U_O$ which when said bypass means is enabled delivers said offset signal $U_O$ to a second adder and to a storer which stores the then current offset signal $U_O$ for one time cycle T of said repeating cycle timer and delivers said stored offset signal $U_O$ to said first adder as the previous offset signal $U_{O-1}$ where it is added to the then current said control signal $U_{PD}$ at the next time cycle T to define the next offset signal $U_O$ as the summation of the then current $U_{PD}$ signal and the previous offset signal $U_{O-1}$, delivering the then current offset signal $U_O$ to a second adder and adding said then current offset signal $U_O$ to said then current control signal $U_{PD}$ to provide and output control signal $U_{PD+O}$ and controlling said robot in accordance with said output signal $U_{PD+O}$.

Preferably said bypass means is a multiplier and said offset signal systems activates said bypass means by inputting a value of 1 to said multiplier.

Preferably, said control signal will be generated by a PD type controller.

Preferably, said method will further comprise determining a modifying factor $\mu$ based on said error signal X when said error signal X is less than said preselected maximum $X_L$ and multiplying said robot control signal $U_{PD}$ by said modifying factor $\mu$ to define a modified robot control signal $U_{PDM}$ and delivering said modified robot control signal $U_{PDM}$ to said first adder in place of said then current control signal $U_{PD}$.

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENTS

Figure 1:
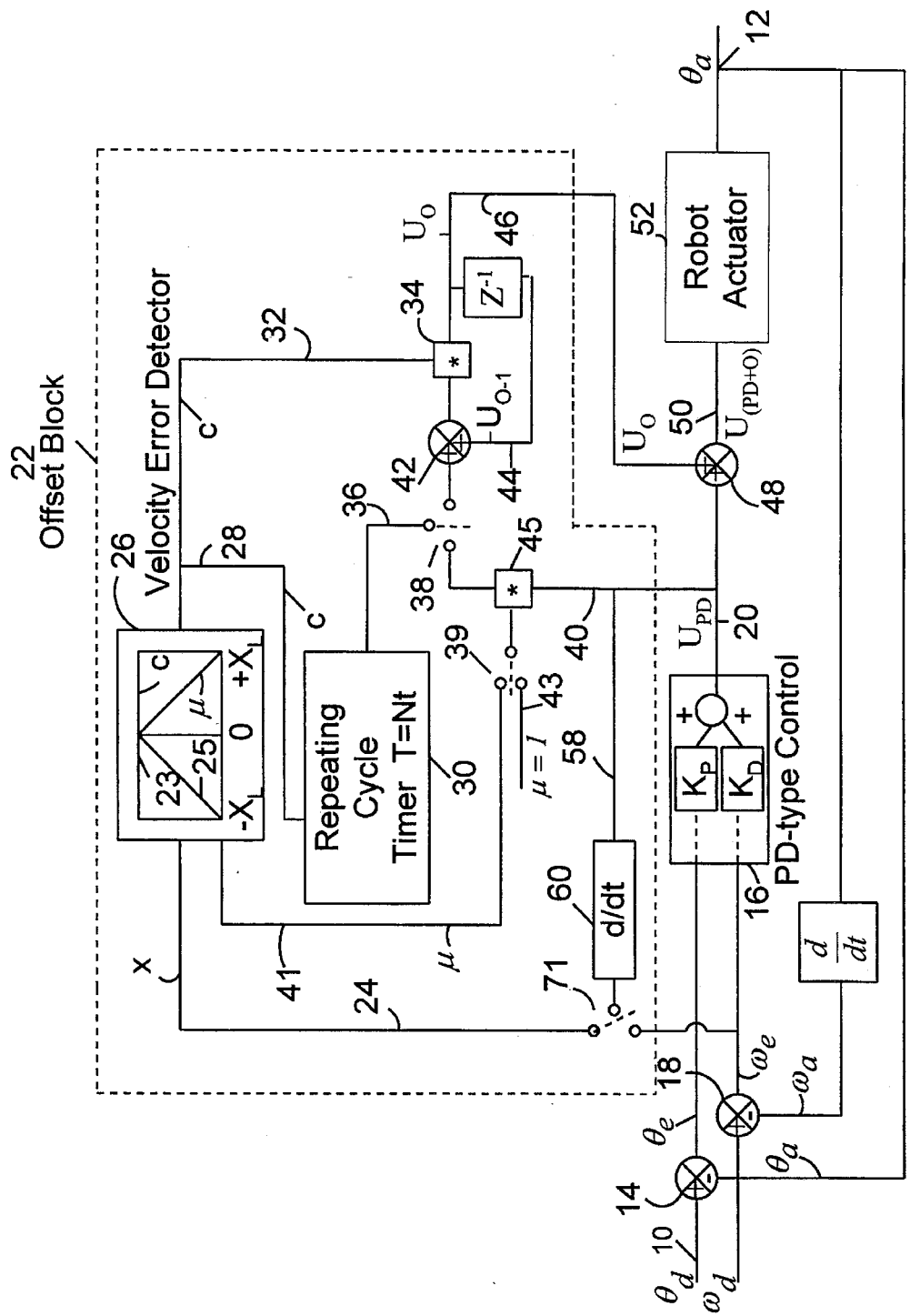
FIG. 1 is a schematic illustration of a control system incorporating the present invention.

The arrangement shown in FIG. 1 includes a PD type controller 16 supplemented with an offset block 22 which provides an off signal for biasing the control to the hydraulic robot actuator which will be described.

The standard inputs indicated as the desired position $\theta_d$, and indicating the desired velocity $\omega_d$. To illustrate different systems to which the invention may be applied. $\theta_d$ has been separated from $\omega_d$ in FIG. 1 and in effect combined in FIG. 2. The then current position or actual position $\theta_a$ as determined as indicated at 12 and is subtracted from $\theta_d$ by the subtractor 14 to provide a position error signal $\theta_e$ which is delivered to the PD type controller 16.

Similarly, the actual velocity $\omega_a$ is subtracted from the desired velocity $\omega_d$ in the subtractor 18 to provide a velocity error signal $\omega_e$ which is also delivered to the PD controller 16.

The PD controller 16 can operate in the conventional or any other suitable manner to output a robot control signal identified as $U_{PD}$ to line 20.

The offset signal generator indicated by the offset block 22 receives the signal $\omega_e$ or its equivalent, as will be discussed below, and designated as having a value X on line 24 and using the velocity error detector as indicated at 26 determines whether or not $\omega_e$ is equal to or less than the preset limit or maximum value of $\pm X_L$ and generates a signal c, as indicated by the curve 23, equal to 1 when the answer is yes and 0 when the answer is no. The signal c is delivered via line 28 to a cycle timer 30 and via line 32 to a bypass means in the form of a multiplier 34.

If the answer is yes, a signal 1 is transmitted via line 28 to activate the repeating cycle timer 30 and via line 32 to a multiplier 34. The cycle timer 30 at the end of its counted time cycle T closes the updating switch 38, and the multiplier 34 multiplies the incoming signal from the adder 42 (as will be described below) by 1. If the answer is no, a 0 signal is sent to deactivate or simply not activate the timer 30 and if desired resets it to zero and to the multiplier 34 so that the signal from the adder 42 is multiplied in the multiplier 34 by 0.

The value for $X_L$ will likely be different for different systems and may be set for a system by first setting $X_L=0$ and then increase it in small increments until the response is acceptable for the particular actuator being controlled.

The repeating cycle timer 30 sends a triggering pulse via line 36 to close updating switch 38 for a short period of time (preferably for the duration of a time pulse increment t described below) after each time cycle T which, for example, may be defined by counting a preselected number N of time pulses each defining a time increment t generated by suitable clock mechanism (not shown). Thus each time cycle T will be equal to T=Nt.

The value for T will be chosen to be approximately equal to the step response of the particular actuator being controlled by the PD controller 16. Values of T of 0.2 seconds have been found suitable for a particular robot and 0.7 seconds for an excavator.

The pulse time increment t normally will be equal to 0.01 seconds but if desired may be a suitable select value for the particular application. The time the switch 38 is closed at the end of each cycle period T will normally be the duration of one time increment t but if desired could be more and thereby the amount or percentage of the time that the switch 38 is closed is based on the number of pulse increments N and the number of time pulses t for which the switch 38 is held closed at the end of each cycle T.

In some cases it may be desired to use a modifying factor µ determined in the velocity error detector 26 as shown by the curve 25 indicating that as the velocity error $\omega_e$ decrease the factor µ increase so that in the illustrated arrangement when the velocity error ωe or X is zero i.e. X=0 then, in the illustrated arrangement, µ=1 and when $X=\pm X_L$ then µ=0 and when X is between these limits µ is between 1 and 0. The use of the modifying factor is optional and if not to be used may simply be omitted or turned off for example by switch 39 which connects the multiplier 45 either to the line 41 carrying signal µ derived from the detector 26 or to line 43 which sets µ equal to 1.

The switch 38 receives the output signal $U_{PD}$ (or if the modifying factor is used the modified output signal $U_{PDM}$ ($U_{PDM}=\mu*U_{PD}$) from line 20 via line 40 and when switch 38 is closed passes this signal to a first adder 42 where it is added to the offset signal generated at the previous closing of the switch 38 as indicated by the signal (previous offset signal) $U_{O-1}$ in line 44. The combined signal ($U_{PD}$ (or $U_{PDM}$)+$U_{O-1}$), assuming the signal c is still a 1, is multiplied by 1 in the multiplier 34 and forms the then current offset signal $U_O$ which passes via line 46 to the second adder 48 which also receives the signal $U_{PD}$ from line 20 and adds the signals $U_O+U_{PD}$ to form an output signal $U_{PD+O}$ in line 50 which is then delivered to the robot actuator 52 to control the operation of the robot.

In operation when the velocity error signal X is equal to or less than the value $\pm X_L$, the multiplier 34 multiplies the input from adder 42 by 1 and the repeating cycle timer 30 is activated to periodically close the updating switch 38 for short time periods. An initial offset signal $U_O$ is generated and fed to the second adder 48 and stored as indicated at $Z^{-1}$. At the next closing of the switch 38, i.e. the end of the next time cycle T, the signal $U_{O-1}$ (previous offset signal) stored in $Z^{-1}$ is fed to the first adder 42 and is added to the current signal $U_{PD}$ (or $U_{PDM}$) in the adder 42 to provide the then current offset signal $U_O$ which is stored in $Z^{-1}$ to provide the signal $U_{O-1}$ for the next cycle and is delivered to the second adder 48 and added to then current control signal $U_{PD}$ to provide an updated control signal $U_{PD+O}$ which is used by the hydraulic actuator 52.

If the velocity error $\omega_e$ i.e. X is greater than $\pm X_L$, then the multiplier 34 multiplies by 0 and provides a signal $U_O$ equal to 0 and the timer 30 is not activated, thus, the signal in lines 44 and 46 becomes zero and the signal in line 50 is simply $U_{PD}$.

It has been found that the trajectory of the end point of the robot 50 follows much more closely the desired trajectory during ramping up and in steady state operation and overshoot and oscillation of the end point are significantly reduced when the present invention is applied.

If desired, the switch 38 could be replaced by a multiplier set to multiply by 0 when the switch 38 is open and by a selected multiplier generally equal to 1 when the switch 38 is closed.

The above description has been based on the magnitude of velocity error $\omega_e$ signal as determined by directly monitoring this signal and using this value for X.

The system will operate as effectively by defining X by differentiating the output signal $U_{PD}$ as indicated by the line 58 and the differentiator 60 which provides a rate signal substantially proportionally equivalent to the velocity error $\omega_e$. The switch 71 may be used to select which of the two systems are to be used or alternatively the system that is not to be used may simply be omitted As shown by FIG. 2 when the position control signal $\theta_e$ is used a signal substantially equivalent to $\omega_e$ defined by differentiating the $\theta_e$ in line 72 via the differentiator 74 provides the signal $\omega_e'$ used to define X.

Figure 2:
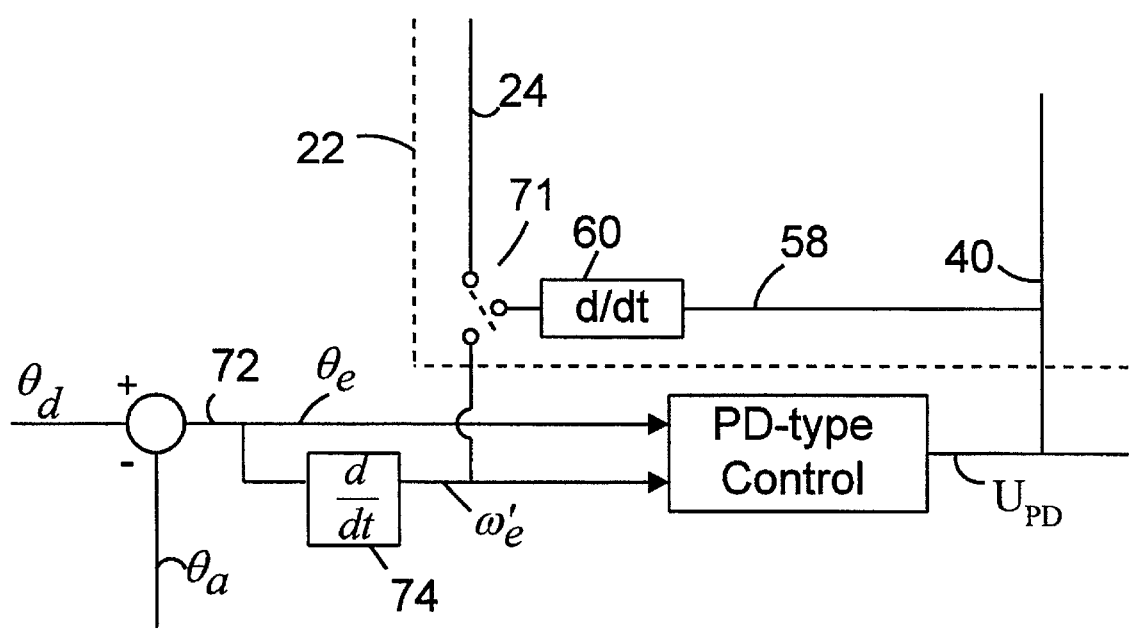
FIG. 2 is a schematic illustration of alternative systems for obtaining a velocity error signal or its equivalent for the purposes of the control system of the present invention

An alternative shown in FIG. 2 is to differentiate the output signal $U_{PD}$ as indicated by the line 58' and differentiator 60' to define signal X in the same manner a shown for the system illustrated in FIG. 1. The output used to define X in the embodiment of FIG. 1 may be selected by the switch 71' or the unused system simply omitted as described above with respect to the FIG. 1 embodiment.

Having described the invention, modifications will be evident to those skilled in the art without departing from the scope of the invention as defined in the appended claims.

We claim:

1. A method of controlling a robot comprising generating an error signal X related to a velocity error signal $\omega_e$, generating robot control signal $U_{PD}$ based in part on said velocity error signal $\omega_e$, activating an offset signal system when said error signal X is less than a preselected maximum $X_L$, said offset signal system actuating a repeating cycle timer and enabling a bypass means, said timer enabling an updating means at the end of each time cycle T defined by the repeating cycle timer to deliver said robot control signal $U_{PD}$ to a first adder when said updating means is enabled, said first adder outputting an offset signal $U_O$ which when said bypass means is enabled delivers said offset signal $U_O$ to a second adder and to a storer which stores the then current offset signal $U_O$ for one time cycle T of said repeating cycle timer and delivers said stored offset signal $U_O$ to said first adder as the previous offset signal $U_{O-1}$ where it is added to the then current said control signal $U_{PD}$ at the next time cycle to define the next offset signal $U_O$ as the summation of the then current $U_{PD}$ signal and the previous offset signal $U_{O-1}$, delivering the then current offset signal $U_O$ to a second adder and adding said then current offset signal $U_O$ to said then current control signal $U_{PD}$ to provide and output control signal $U_{PD+O}$ and controlling said robot in accordance with said output signal $U_{PD+O}$.

2. A method as defined in claim 1 wherein said control signal $U_{PD}$ is generated by a PD type controller.

3. A method as defined in claim 1 further comprising determining a modifying factor $\mu$ based on said error signal X when said error signal X is less than said preselected maximum $X_L$ and multiplying said robot control signal $U_{PD}$ by said modifying factor $\mu$ to define a modified robot control signal $U_{PDM}$ and delivering said modified robot control signal $U_{PDM}$ to said first adder in place of said then current control signal $U_{PD}$.

4. A method as defined in claim 2 further comprising determining a modifying factor $\mu$ based on said error signal X when said error signal X is less than said preselected maximum $X_L$ and multiplying said robot control signal $U_{PD}$ by said modifying factor $\mu$ to define a modified robot control signal $U_{PDM}$ and delivering said modified robot control signal $U_{PDM}$ to said first adder in place of said then current control signal $U_{PD}$.

5. A method as defined in claim 1 wherein said bypass means is a multiplier and said offset signal systems activates said bypass means by inputting a value of 1 to said multiplier.

6. A method as defined in claim 2 wherein said bypass means is a multiplier and said offset signal systems activates said bypass means by inputting a value of 1 to said multiplier.

7. A method as defined in claim 3 wherein said bypass means is a multiplier and said offset signal systems activates said bypass means by inputting a value of 1 to said multiplier.

8. A method as defined in claim 4 wherein said bypass means is a multiplier and said offset signal systems activates said bypass means by inputting a value of 1 to said multiplier.

9. An apparatus for controlling a robot comprising means for generating an error signal X related to a velocity error signal $\omega_e$, means for generating robot control signal $U_{PD}$, an error detector means for activating an offset signal system when said error signal X is less than a preselected maximum $X_L$, repeating cycle timer means, a bypass means, said error detector means actuating said repeating cycle timer and said bypass means, an updating means, said timer enabling said updating means at the end of each time cycle T defined by the repeating cycle timer to deliver said robot control signal $U_{PD}$ to a first adder when said updating means is enabled, said first adder outputting an offset signal $U_O$ which when said bypass means is enabled delivers said offset signal $U_O$ to a second adder and to a storer which stores the then current offset signal $U_O$ for one time cycle T of said repeating cycle timer and delivers said stored offset signal $U_O$ to said first adder as the previous offset signal $U_{O-1}$ where it is added to the then current said control signal $U_{PD}$ at the end of the next time cycle T to define the next offset signal $U_O$ as the summation of the then current $U_{PD}$ signal and the previous offset signal $U_{O-1}$, means for delivering the then current offset signal $U_O$ to a second adder and adding said then current offset signal $U_O$ to said then current control signal $U_{PD}$ to provide and output control signal $U_{PD+O}$ and controlling said robot in accordance with said output signal $U_{PD+O}$.

10. An apparatus as defined in claim 9 wherein said control signal $U_{PD}$ is generated by a PD type controller.

11. An apparatus as defined in claim 9 further comprising means for determining a modifying factor $\mu$ based on said error signal X when said error signal X is less than said preselected maximum $X_L$ and means multiplying said robot control signal $U_{PD}$ by said modifying factor $\mu$ to define a modified robot control signal $U_{PDM}$ and means delivering said modified robot control signal $U_{PDM}$ to said first adder in place of said then current co20ntrol signal $U_{PD}$.

12. An apparatus as defined in claim 11 further comprising means for determining a modifying factor $\mu$ based on said error signal X when said error signal X is less than said preselected maximum $X_L$ and means multiplying said robot control signal $U_{PD}$ by said modifying factor $\mu$ to define a modified robot control signal $U_{PDM}$ and means delivering said modified robot control signal $U_{PDM}$ to said first adder in place of said then current control signal $U_{PD}$.

13. An apparatus as defined in claim 9 wherein said bypass means is a multiplier and said offset signal systems activates said bypass means by inputting a value of 1 to said multiplier.

14. An apparatus as defined in claim 10 wherein said bypass means is a multiplier and said offset signal systems activates said bypass means by inputting a value of 1 to said multiplier.

15. An apparatus as defined in claim 11 wherein said bypass means is a multiplier and said offset signal systems activates said bypass means by inputting a value of 1 to said multiplier.

16. An apparatus as defined in claim 12 wherein said bypass means is a multiplier and said offset signal systems activates said bypass means by inputting a value of 1 to said multiplier.

* * * * *